United States Patent
Duffe

(10) Patent No.: US 10,150,437 B2
(45) Date of Patent: Dec. 11, 2018

(54) BUMPER UNIT FOR A MOTOR VEHICLE

(71) Applicant: FORD GLOBAL TECHNOLOGIES, LLC, Dearborn, MI (US)

(72) Inventor: Tobias Duffe, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 24 days.

(21) Appl. No.: 15/359,363

(22) Filed: Nov. 22, 2016

(65) Prior Publication Data
US 2017/0151920 A1 Jun. 1, 2017

(30) Foreign Application Priority Data
Nov. 30, 2015 (DE) .................. 10 2015 223 730

(51) Int. Cl.
*B60R 19/34* (2006.01)
*B60R 19/02* (2006.01)

(52) U.S. Cl.
CPC ............ *B60R 19/34* (2013.01); *B60R 19/023* (2013.01)

(58) Field of Classification Search
CPC .............................. B60R 19/34; B60R 19/023
USPC ........................................................ 296/133
See application file for complete search history.

(56) References Cited

U.S. PATENT DOCUMENTS

| 1,885,398 | A | 11/1932 | Wilson et al. |
|---|---|---|---|
| 5,530,219 | A | 6/1996 | Offer et al. |
| 7,748,596 | B2 | 7/2010 | Ishikawa et al. |
| 2015/0061307 | A1* | 3/2015 | Nakanishi ............... B60R 19/34 293/133 |
| 2015/0298634 | A1* | 10/2015 | Hara ....................... B60R 19/34 293/133 |

FOREIGN PATENT DOCUMENTS

| CN | 103192223 | 7/2013 |
|---|---|---|
| DE | 102007033764 | 1/2008 |
| EP | 1674187 | 6/2006 |

\* cited by examiner

*Primary Examiner* — Joseph D. Pape
*Assistant Examiner* — Dana D Ivey
(74) *Attorney, Agent, or Firm* — Jason Rogers; Brooks Kushman P.C.

(57) ABSTRACT

The invention relates to a bumper unit for a motor vehicle, having a crumple element attached to a bumper and a connecting plate that is adapted to be connected to a vehicle structure. The connecting plate is connected to the crumple element by at least one primary weld seam. At least one reinforcing element is connected to the crumple element in a connecting region that adjoins a primary weld seam and extends away from the primary weld seam.

19 Claims, 5 Drawing Sheets

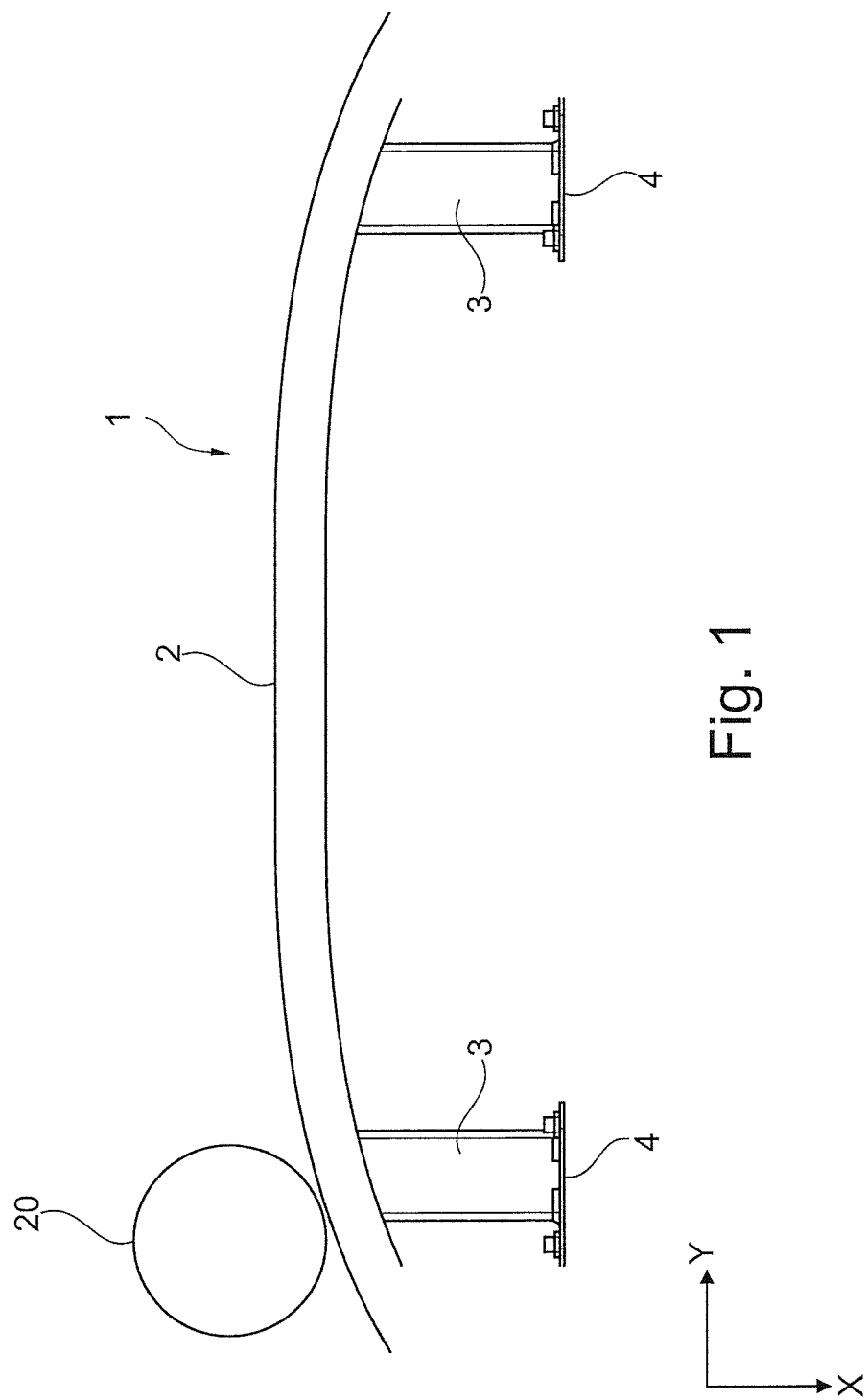

BUMPER UNIT FOR A MOTOR VEHICLE

CROSS-REFERENCE TO RELATED APPLICATIONS

This application claims foreign priority benefits under 35 U.S.C. § 119(a)-(d) to DE 10 2015 223 730.3 filed Nov. 30, 2015, which is hereby incorporated by reference in its entirety.

TECHNICAL FIELD

The invention relates to a bumper unit for a motor vehicle a crumple member joined by a primary weld to a connecting member and including a reinforcement welded to the crumple member in a heat affected zone created by the primary weld.

BACKGROUND

In modern motor vehicles, one significant aspect in the planning process is the design of the crumple zones, i.e. those regions or components of the vehicle which absorb energy through deformation in an accident and thus protect other vehicle regions and, especially, the occupants from damage or injury. In a typical design concept, the actual bumper is connected to the vehicle chassis by energy absorption elements (e.g. crash boxes, crash tubes or crumple cells). The bumper itself is of more robust design by virtue of its shape and material. The energy absorption elements, which extend approximately in the direction of travel, are less robust. These can be composed of aluminum or an aluminum alloy, for example, and deform relatively easily when a force is exerted on them by the bumper.

In the case of low-speed rear end collisions, the deformation can thus ideally be limited substantially to the energy absorption elements, while the vehicle chassis remains undamaged. This may considerably reduce repair costs. The bumper can optionally also be formed integrally with the energy absorption elements. Actual attachment to the vehicle chassis is generally accomplished by means of connecting plates that are welded to the energy absorption elements and can be connected to the vehicle chassis, for example to a longitudinal frame member, e.g. by a threaded fastener connection.

A heat-affected zone, in which stresses can arise in the material due to heating and cooling and there may also be unwanted changes at the microstructural level, forms on both sides of the weld seam during the welding of the energy absorption element to the connecting plates. The mechanical characteristics of the material in the heat-affected zone can change in a negative way relative to the parent material. As a result, cracks can form preferentially in the heat-affected zone and also propagate within the zone when a load is imposed. This can have the effect, for example, that the energy absorption element separates completely or at least partially from the connecting plate even though the actual weld seam remains intact. In this case, structural integrity, i.e. the mechanical connection formed by the bumper bar between the two longitudinal members, is no longer assured. Failure of the element can occur, for example, in the event of a collision with a fixed obstacle offset relative to the center of the vehicle (e.g. in an SORB test (small offset rigid barrier)), and this failure can be observed on the opposite side from the impact.

U.S. Pat. No. 1,885,398 A shows a method by which it is possible to repair cracks which form at an angle of a flange, for example. In a first step in this method, the region affected by the crack is burnt out electrically or thermally and, in a second step, it is filled by welding. In a third step, a metal piece having the cross section of a right angled triangle is welded into the angle.

U.S. Pat. No. 5,530,219 A describes a welded bracket which can be used to repair a reactor vessel in which cracks have formed due to stress corrosion. The bracket is screwed to the reactor vessel and comprises a plurality of annular parts, which are welded together in a special method. Two bracket segments to be joined are butted together, wherein the abutting ends have a kind of central projection, on both sides of which there remain gaps which are welded with a special blade type electrode during the welding process.

EP 1 674 187 A1 shows a welding method for producing a welded joint which prevents propagation of embrittlement cracks. For this purpose, a repair weld is made to a butt weld seam, the repair weld being harder than the butt weld seam. The repair weld is approximately triangular in shape, and a vertex of the triangle lies on the butt weld seam. The sides of the triangle enclose an angle of between 10° and 60° with the direction of extent of the seam. As an option, the repair weld can be combined with a reinforcing plate which rests by means of one edge on the butt welded workpiece and is welded to the latter.

CN 103192223 shows a method for treating cracks in a heat-affected zone of a weld seam. Here, an ultrasound analysis of the crack is first of all performed, after which material is either chiseled or milled out. In a subsequent step, holes are drilled at the ends of the crack. A repair weld is then carried out, this being preceded and followed in each case by heat treatment of the workpiece, during which thermal insulation is provided by means of rock wool.

In light of the indicated prior art, there is still room for improvement in the provision of a bumper unit with optimized crash behavior, especially with the aim of preventing unwanted severing of the joints to the vehicle structure.

SUMMARY

The features and measures presented individually in the following description can be combined in any technically meaningful way and give rise to further embodiments of the invention. The description additionally characterizes and specifies the invention, especially in conjunction with the figures.

The bumper unit has a crumple element for attachment to a bumper and a connecting plate for connection to a vehicle structure, a longitudinal frame member. The connecting plate is connected to the crumple element by at least one primary weld seam. The crumple element, which can also be referred to as an energy absorption element, can be designed as a crash box, crash tube or crumple cell, for example. Its function is to allow relatively easy deformation in comparison with adjoining components during an accident, especially a rear end collision, and thereby ideally to protect adjoining components from deformation. The crumple element is provided for attachment to the bumper, which can also be referred to as a bumper beam, and this explicitly includes the possibility that the crumple element will be formed integrally with the bumper and attached to the latter from the outset.

The bumper may be connected to two crumple elements arranged symmetrically with respect to the center of the vehicle. The bumper extends transversely to the direction of travel when installed, i.e. along the Y axis (transverse axis) of the vehicle, even if it is not fully parallel to the Y axis but can be curved, for example. The term "bumper unit" is intended to mean that the corresponding unit is associated with the bumper, but the bumper does not necessarily have to be part of the bumper unit. The bumper unit can be mounted both on the front and on the rear of the vehicle.

The crumple element or elements typically extends or extend along the X axis (longitudinal axis). In particular, they can be designed as hollow profiles, although it is also possible to conceive of embodiments in which at least one crumple element is composed of foamed metal, for example, and may be considered to be of "solid" design, i.e. does not have a relatively large continuous cavity.

The connecting plate is used for attachment to the vehicle structure of the motor vehicle, generally to a longitudinal, or frame, member. The connecting plate can have holes, for example, through which screws or rivets can be passed to attach the plate to the frame member. When installed, the connecting plate extends in the Y-Z plane.

The crumple element is connected to the connecting plate by at least one primary weld, and there are no restrictions in the context of the invention as regards the type of welding method by means of which this weld seam has been produced. The term "primary" serves merely to provide a distinction with respect to other weld seams and, in this context, denotes a weld seam which connects the crumple element and the connecting plate. There can be just one primary weld seam, which is formed around an end region of the crumple element, wherein the end region is arranged on the fastening plate, or there can be a plurality of weld seams (or one weld seam can have an interruption).

The welding process normally leads to heating (and subsequent cooling) of the adjoining regions of the crumple element and of the connecting plate, as a result of which the mechanical characteristics may be diminished relative to the rated values of the parent material and hence may be conducive to cracking.

To prevent cracking, at least one reinforcing element is connected to the crumple element in a connecting region that adjoins the primary weld seam and extends away from the primary weld seam. The connecting region is the region in which the reinforcing element is connected to the crumple element, i.e. is in contact therewith directly or indirectly (e.g. by means of a material joint). The reinforcing element reinforces the structure of the crumple element and connects the crumple element to the connecting plate. A plurality of reinforcing elements may be provided. The connecting region adjoins the primary weld seam, and may touch or merging into the primary weld seam. The connecting region starts from and extends away from the primary weld seam.

The basic concept of the invention is to inhibit the propagation of a crack along the heat-affected zone of the primary weld seam. Cracks in the heat affected zone are diverted and ideally to prevented. The connecting region adjoins the primary weld seam or starts at the primary weld seam so that a crack propagating along the heat-affected zone of the primary weld seam meets the connecting region. The reinforcing element connected in the connecting region provides structural reinforcement, making further propagation of the crack more difficult. In particular, it is possible for the crack to be diverted, more specifically in such a way that it shifts out of the heat affected zone of the primary weld seam and finally ends in unimpaired, i.e. unaffected, parent material lying outside the heat-affected zone. The reinforcing element as disclosed is welded, it could also be adhesively bonded, and screwed or riveted joints are also conceivable.

Normally, the at least one reinforcing element is restricted to one part of the abovementioned end region, i.e. it can be restricted to a maximum of 50% or a maximum of 30% of the end region, for example, in the circumferential direction (with this being a total figure in the case of a plurality of reinforcing elements). The extent of a reinforcing element along the Y axis can likewise be restricted to a maximum of 50% or a maximum of 30% of the extent of the crumple element. The same can apply to its extent along the Z axis, wherein these statements self-evidently apply to the installed state, where the Y axis corresponds to the transverse axis of the vehicle and the Z axis corresponds to the vertical axis of the vehicle.

At least one reinforcing element is connected materially to the crumple element. For example, by brazing, welding or adhesive bonding. The reinforcing element is securely connected to allow direct force transmission between the reinforcing element and the crumple element. A material connection also includes the possibility of the reinforcing element being produced integrally with the crumple element, but in general the reinforcing element is a separately produced component, which is then connected materially to the crumple element. Connections between the reinforcing element and the crumple element may also be positive or non-positive connections.

There is also a heat-affected zone within the connecting plate that may weaken the structure of the connecting plate. In many cases, cracking within the connecting plate is less probable or less problematic by virtue of the structure or arrangement of the connecting plate on the vehicle structure (e.g. on the longitudinal member) and of the direction of the effective forces to be expected. However, it is advantageous to prevent or limit such cracking by providing at least one reinforcing element that is connected both to the crumple element and to the connecting plate. It is thereby possible not only to counteract cracking within the connecting plate but also to improve the connection between the connecting plate and the crumple element. The connecting plate has a relatively great material thickness and the crack can occur in the crumple element. The at least one reinforcing element is connected materially to the connecting plate by a welded joint. The reasons for this have already been explained with reference to the connection between the connecting element and the crumple element.

The at least one reinforcing element may be a sheet-metal part. Here, the reinforcing element can be composed of the same metal as the crumple element or the connecting plate. It has been found that a sheet-metal part, which can optionally be of relatively thin design, is often sufficient to limit or divert the cracking in the desired manner. A sheet-metal part can easily be given the desired shape and thus be adapted to the respective requirements of the bumper unit. Of course, a sheet-metal part is well-suited for welding or brazing to the crumple element and the connecting plate.

A sheet-metal reinforcing element part may include surfaces that are disposed on the crumple element and on the connecting plate. The extended area of contact contributes overall to the stabilization of the joint. The reinforcing element may be disposed at an edge on the crumple element or the connecting plate and may project from the edge. A sheet-metal reinforcing element may have an L-shaped, angled profile which rests flat on the crumple element and flat on the connecting plate. The reinforcing element can be formed by a single rectangular sheet metal strip which is bent or kinked at one location.

The at least one reinforcing element is connected to the crumple element and the connecting plate by at least one secondary weld seam. The term "secondary" serves merely to provide a distinction from the primary weld seam and denotes a weld seam used to attach the reinforcing element. The secondary weld seam adjoins the primary weld seam and extends away from the primary weld seam. The secondary weld seam touches the primary weld seam or merges into the latter. The secondary weld seam may be created in a single operation with the primary weld seam in the welding process. The secondary weld seam or secondary weld seams form a connecting region which extends away from the primary weld seam. A change of direction of the secondary weld seam is recognizable relative to the primary weld seam. In some embodiments, the at least one secondary weld seam can be thinner than the primary weld seam. At least one secondary weld seam can optionally cross the primary weld seam and thus be formed continuously from the crumple element to the connecting plate.

Although each secondary weld seam produces an associated heat-affected zone, which can cause a further local weakening of the material, the stability of the component (crumple element or connecting plate) can in fact be improved by the secondary weld seam. The secondary weld seam acts as a barrier which counteracts or diverts the propagation of the crack forming in the heat-affected zone of the primary weld seam. Diversion of the crack into the heat-affected zone of the secondary weld seam makes it possible to prevent complete severing of the component. Depending on the arrangement and embodiment of the secondary weld seam, there is the possibility that the crack will not propagate to an arbitrary distance and will not propagate back into the heat affected zone of the primary weld seam, but will end in the material outside a heat-affected zone. The primary weld seam is expediently interrupted in the region of the reinforcing element and does not fully encircle the weld seam and the corresponding heat-affected zone.

It is advantageous to provide a relatively large angle between the secondary weld seam and the primary weld seam to divert any crack that may occur. At least one secondary weld seam preferably encloses an angle of between 45° and 135° with the primary weld seam. As a further preference, the angle can be between 65° and 115° or between 80° and 100°. It has been found that reliable diversion of a crack away from the primary weld seam can generally be achieved even at an angle of 90°. The angles mentioned promote tensile loading in the X direction.

The at least one reinforcing element may be connected to the crumple element and the connecting plate by two mutually spaced secondary weld seams. This embodiment is appropriate especially if the reinforcing element is designed as a sheet-metal part and especially if it is in extended-area contact, as described above. The two secondary weld seams can be arranged on opposite sides of the reinforcing element, e.g. on opposite edges of a sheet-metal part. The secondary weld seams are spaced apart and, for example, can extend parallel to one another without touching. Accordingly, the heat-affected zones associated with the secondary weld seams do not normally touch either. Thus, it is conceivable for a crack to start from the heat-affected zone of the primary weld seam and to continue in the heat-affected zone of a secondary weld seam but finally to come to the end of this heat-affected zone without there being connected to the heat-affected zone of the other secondary weld seam. The crack "runs out" or meets parent material which has not been weakened by a welding operation and is stopped.

At least one reinforcing element may be arranged between two mutually spaced primary weld seams. The two spaced primary weld seams define a gap between the two weld seams and the reinforcing element is arranged in this gap. This is advantageous because the heat-affected zones of the two weld seams also do not normally merge into one another which inhibits propagation of a crack. The reinforcing element may be welded both to the crumple element and to the connecting plate. The reinforcing element contributes to the connection between the crumple element and the connecting plate even though there is no primary weld seam in this region. Secondary weld seams starting from each of the primary weld seams are very effectively divert and contain a crack.

There are numerous different possibilities for the arrangement of the reinforcing element or reinforcing elements. The choice of position in each case can depend inter alia on the location at which cracks are expected or are regarded as critical. According to one embodiment, at least one reinforcing element is arranged in the direction of the Y axis with respect to the crumple element and, in particular, can extend in the direction of the Z axis. Of course, these statements refer to the installed state of the bumper unit. One could therefore say that the reinforcing element is arranged to the side of the crumple element and extends upward and downward. This can be the case, for example, if the corresponding element is designed as a sheet-metal part which rests flat on the side of the crumple element. Two such reinforcing elements are preferably arranged on each side of the crumple element in the direction of the Y axis. It should be noted that a reinforcing element of this kind also extends in the direction of the X axis (longitudinal axis) of the vehicle. As an alternative or in addition to this, at least one reinforcing element can be arranged in the direction of the Z axis with respect to the crumple element and, in particular, can extend in the direction of the Y axis. A reinforcing element of this kind is therefore situated above and below the crumple element and extends sideward. Here too, it can be a sheet-metal part which rests flat on the top side or bottom side of the crumple element. It is advantageous if a reinforcing element of this kind is provided both on the top side and on the bottom side.

The crumple element can be composed at least predominantly of aluminum. This includes the possibilities of the crumple element (apart from impurities) being composed of pure aluminum or of an aluminum alloy. This embodiment is advantageous with regard to a low weight and a desired deformation behavior. In this case, the crumple element can be designed as a hollow profile, being circular, oval or polygonal (in particular rectangular) for example. Of course, it can have local weakening structures, such as recesses or beads, by means of which a deformation of the crumple element can be initiated selectively in a collision. A bead may function to reinforce the crumple element. However, the crumple element can also be composed partially of foamed aluminum, wherein a hollow profile comprising foamed aluminum is preferably formed.

The connecting plate can also be composed predominantly of aluminum and can optionally be produced from the same material as the crumple element. To this extent, if the reinforcing element is also composed of a material of the same type, for example, of aluminum. It is possible to achieve welded joints of the same type that facilitates the choice of welding filler material, even if the weld seams are produced in the form of fillet seams, for example. The stated material, aluminum, should be taken only as illustrative, and other weldable light metals or metals can also be used.

Further advantageous details and effects of the invention are explained in greater detail below with reference to an illustrative embodiment shown in the figures.

BRIEF DESCRIPTION OF THE DRAWINGS

FIG. 1 is a schematic illustration of a plan view of a bumper unit and of a fixed obstacle.

DETAILED DESCRIPTION

Figure 2A:
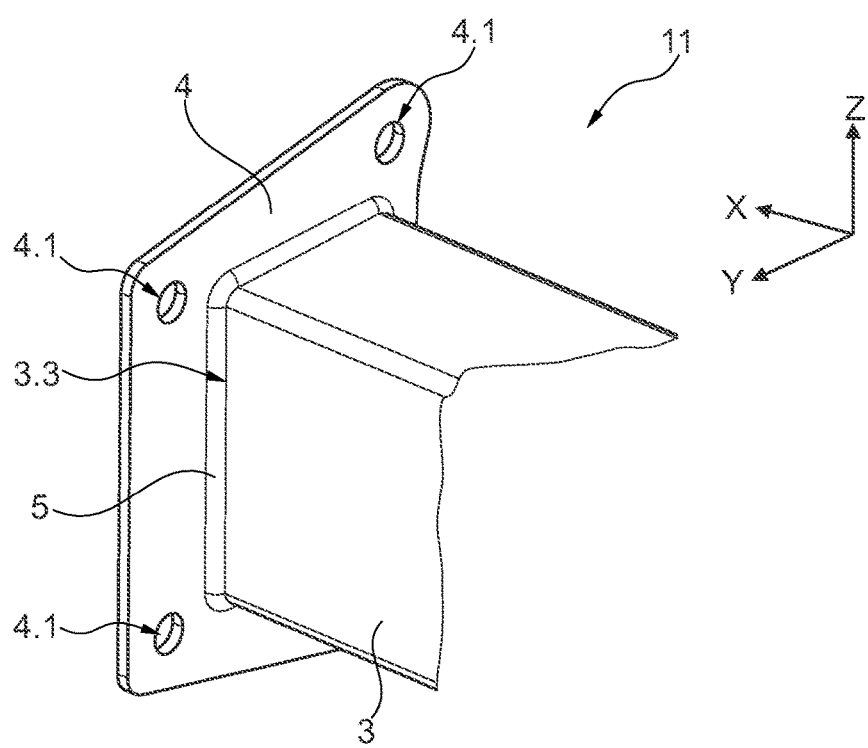
FIG. 2A is a perspective illustration of a bumper unit according to the prior art in a basic state.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

FIG. 1 is a plan view of a bumper unit 1 of a vehicle during a collision with a fixed obstacle 20. A typical SORB crash situation is shown here, wherein the fixed obstacle 20 is struck only by a relatively small side area of the vehicle. The bumper unit 1 comprises a bumper 2, which extends substantially along the Y axis of the vehicle and is welded to two crumple elements, which are designed as crumple cells 3 in the present case. These extend substantially along the X axis. Each crumple cell 3, in turn, is welded to a connecting plate 4, which is used for attaching the entire bumper unit 1 to a longitudinal member (not shown here) of the vehicle. The crash situation illustrated should be taken as purely illustrative, as a situation in which the advantages of the invention come into effect. In the situation illustrated, the crumple cell 3 which is arranged at the end of the bumper unit 1 remote from the obstacle 20 is subject to loading of a special kind. There, there is the possibility, in particular, that the crumple cell 3 will separate from the connecting plate 4, thus impairing or destroying the structural integrity of the bumper unit 1 as a whole. In the sense according to the invention, the term "structural integrity" means that both longitudinal members remain connected.

FIG. 2A shows part of a bumper unit 11 according to the prior art, the construction of which is the same as that of the bumper unit 1 shown in FIG. 1, although only one crumple cell 3 with the associated connecting plate 4 is shown. In the present case, all the parts 3 and 4 mentioned are composed of aluminum alloys, resulting in a very favorable weight. The connecting plate 4 is provided with holes 4.1, through which screws or rivets for connection to the longitudinal member can be passed. The crumple cell 3 has a substantially rectangular hollow profile. In an end region 3.3 of the crumple cell 3 resting on the connecting plate 4, the cell is welded to the connecting plate 4 by means of a single encircling weld seam 5. In the region of the bumper (not shown), there is a connection between the crumple cell 3 and the bumper (not shown) via a weld seam (not shown; and also via further weld seams, which are concealed here), it being possible for the connection to be supported by partial positive engagement. The production of the weld seams 5 is associated with heating and subsequent cooling of the adjacent material, and this can lead, on the one hand, to stresses in the material and, where applicable, to a change in the micro structure. In the heat-affected zones associated therewith, the material is therefore particularly susceptible to cracks. The precise extent of the heat-affected zone is dependent on the material, on the type of welding method and on other factors, but it can be of the order of the width of the respective weld seam 5.

Figure 2B:
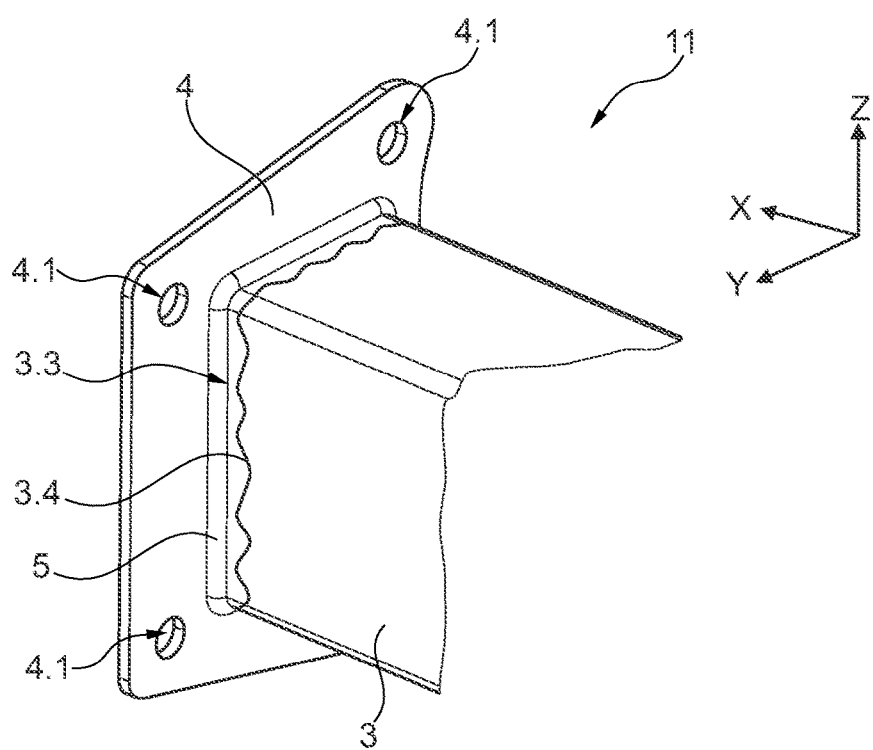
FIG. 2B is a perspective illustration of the bumper unit from FIG. 2A with an expected crack path.

Cracking within the heat-affected zone is illustrated by the depiction in FIG. 2B, which shows a typical example of damage that can occur in an SORB crash situation at the nonimpact end, as in FIG. 1. Here, a crack 3.4 has formed in the end region 3.3 adjoining the weld seam 5. Owing to the weakening of the material in the heat-affected zone, the crack 3.4 has propagated virtually unhindered around the entire crumple cell 3 along the end region 3.3, and this can lead to the crumple cell 3 separating from the connecting plate 4.

Figure 3A:
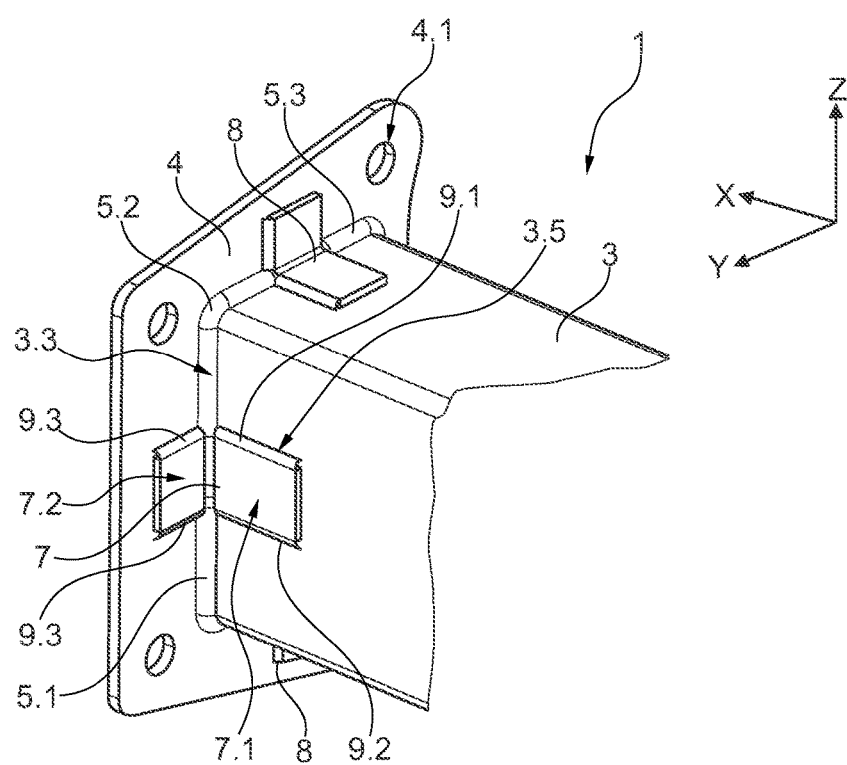
FIG. 3A is a perspective illustration of a bumper unit according to the invention in a basic state.
Figure 3B:
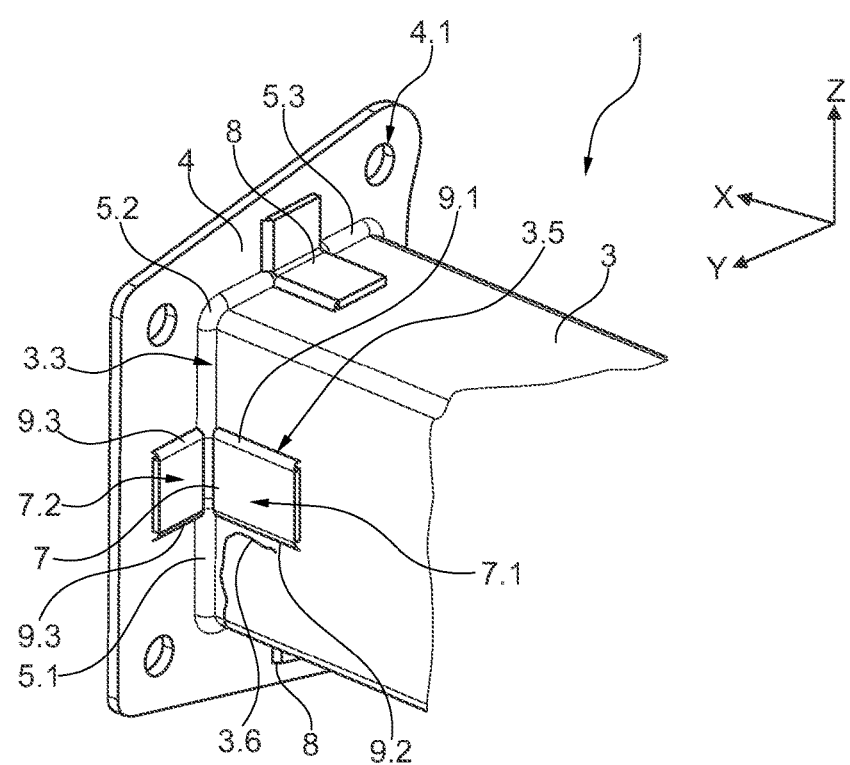
FIG. 3B is a perspective illustration of the bumper unit from FIG. 3A with an expected crack path.

This risk is largely eliminated in the bumper unit 1 according to the invention, which is shown in FIGS. 3A and 3B. This corresponds largely to the bumper unit 11 shown in FIGS. 2A and 2B and, to this extent, is not discussed again in detail. In particular, the embodiment of the bumper 2, the crumple cell 3 and of the connecting plate 4 is identical.

Here, however, the crumple cell 3 is attached to the connecting plate 4 in a different way.

Thus, a plurality of spaced or separate primary weld seams 5.1, 5.2, 5.3, between which respective reinforcing elements 7, 8 are arranged, is provided here instead of a single encircling weld seam 5. Each of the reinforcing elements 7, 8 is designed as a sheet-metal part composed of an aluminum alloy and angled in an L shape. Here, two reinforcing elements 7 are arranged along the Y axis on the sides of the crumple cell 3 (one of them being concealed in the drawing), while two further reinforcing elements 8 are arranged along the Z axis on the top and bottom sides of the crumple cell 3.

One of the lateral reinforcing elements 7 is described below by way of example. This rests flat on the crumple cell 3 by means of a first section 7.1 and flat on the connecting plate 4 by means of a second section 7.2. The reinforcing element 7 is bent out of a rectangular piece of sheet metal. It is connected to the crumple cell 3 in a connecting region 3.5, which extends away from the primary weld seams 5.1, 5.2. In this case, secondary weld seams 9.1, 9.2 start from the primary weld seams 5.1, 5.2 adjoining reinforcing element 7 and extend away from them at an angle of 90°, wherein they connect the sides of the first section 7.1 to the crumple cell 3. In a corresponding way, further secondary weld seams 9.3, 9.4, which connect the second section 7.2 to the connecting plate 4, start from the primary weld seams 5.1, 5.2. Here, the secondary weld seams 9.1, 9.2 are spaced apart by the first section 7.1, and the secondary weld seams 9.3, 9.4 are likewise spaced apart by the second section 7.2, i.e. they do not touch and neither the end of the first region 7.1 remote from the connecting plate 4 nor the end of the second region 7.2 remote from the crumple cell 3 are welded on, i.e. there is no weld seam there. In a corresponding way, the heat-affected zones of the secondary weld seams 9.1, 9.2 and likewise those of the secondary weld seams 9.3, 9.4 are not connected to one another either.

In the event of a collision, the embodiment shown in FIG. 3A has decisive effects, as illustrated in FIG. 3B, which shows damage which can occur, for example, in a crash situation as shown in FIG. 1. Here, a crack 3.6 has formed within the heat-affected zone of a primary weld seam 5.1 on the side away from the impact and has propagated by a certain distance along the weld seam 5.1 in the direction of reinforcing element 7. However, little or no further propagation of the crack 3.6 in this direction is possible since the propagation path is, as it were, blocked by the transversely extending secondary weld seam 9.2. On the other hand, the crack 3.6 can propagate along secondary weld seam 9.2 within the heat-affected zone thereof, as shown. It is thus directed away, i.e. diverted, from primary weld seam 5.1. Since there is no further weld seam adjoining secondary weld seam 9.2 but a significant distance with respect to secondary weld seam 9.1, the heat-affected zone of secondary weld seam 9.2 ends and merges into parent material, i.e. material that has not been impaired by the effect of heat. The crack 3.6 is thereby definitively stopped, and separation of the crumple cell 3 from the connecting plate 4 is prevented.

The reinforcing element 7 reinforces the structure of the bumper unit 1 and the connection between the crumple cell 3 and the connecting plate 4 in various ways. On the one hand, it brings about a local increase in the wall thickness of the crumple cell 3, i.e. for the crumple cell 3 to separate from the connecting plate 4, both the crumple cell 3 and the reinforcing element 7 would have to crack. Moreover, the secondary weld seams 9.1, 9.2 extending at a 90° angle to the adjoining primary weld seams 5.1, 5.2 represent obstacles for propagating cracks since a weld seam is normally very strong per se and does not tend to crack. Moreover, the fact that secondary weld seam 9.2 is connected to primary weld seam 5.1 (and secondary weld seam 9.1 is connected in a corresponding way to primary weld seam 5.2) ensures that the heat-affected zones of the two seams merge, thus providing, as it were, a natural propagation path for a crack 3.6, leading it into a region in which it is stopped since the material is not affected by heat there.

If a crack did form in the heat-affected zone of a primary weld seam 5.1, 5.2 on the same side as the connecting plate 4, it would be diverted along one of the secondary weld seams 9.3, 9.4 and ultimately stopped. The structure and effect of the upper and lower reinforcing elements 8 correspond to those of the lateral reinforcing elements 7 and are therefore not explained in detail.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A bumper unit for a motor vehicle comprising:
   a bumper;
   crumple element attached to the bumper;
   a connecting plate connected to a vehicle structure and the crumple element by at least one primary weld seam; and
   at least one reinforcing element connected to the crumple element by a secondary weld seam adjoining and extending transverse to the primary weld seam.

2. The bumper unit of claim 1 wherein the at least one reinforcing element is welded to the crumple element.

3. The bumper unit of claim 1, wherein the at least one reinforcing element is connected both to the crumple element and the connecting plate.

4. The bumper unit of claim 1, wherein the at least one reinforcing element is a sheet-metal part.

5. The bumper unit of claim 1, wherein the at least one reinforcing element includes a first surface that is disposed on a second surface on the crumple element and a third surface that is disposed on a fourth surface of the connecting plate.

6. The bumper unit of claim 1, further comprising:
   at least one secondary weld seam applied to the crumple element and the connecting plate that is oriented at an angle of between 45° and 135° relative to the primary weld seam.

7. The bumper unit of claim 1, wherein the at least one reinforcing element is connected to the crumple element and the connecting plate by two spaced secondary weld seams.

8. The bumper unit\ of claim 1, wherein the at least one reinforcing element is arranged between two spaced primary weld seams.

9. The bumper unit of claim 1, wherein at least the crumple element is composed an aluminum alloy.

10. A bumper assembly comprising:
    a bumper beam;
    a crumple element attached to the bumper beam;
    a connecting plate welded by a primary butt weld seam to the crumple element, the connecting plate being attached to a vehicle frame member; and
    at least one reinforcing element having two spaced sides welded to a surface of the crumple element by two spaced weld seams where the weld seams extend away from the primary butt weld seam.

11. The bumper assembly of claim 10 wherein the reinforcing element includes a first wall attached to the crumple element and a second wall attached to the connecting plate.

12. The bumper assembly of claim 11 wherein the two spaced weld seams are oriented transverse relative to the primary weld.

13. The bumper assembly of claim 11 wherein two spaced weld seams are oriented perpendicular relative to the primary butt weld seam.

14. The bumper assembly of claim 10 wherein the crumple element includes a plurality of walls, wherein each one of the reinforcing elements is welded to only one of the plurality of walls.

15. The bumper assembly of claim 14, wherein each one of the reinforcing elements is welded to the connecting plate by the primary weld.

16. The bumper assembly of claim 10, wherein the at least one reinforcing element is connected to the connecting plate by the two spaced secondary weld seams.

17. The bumper assembly of claim 10, wherein the at least one reinforcing element is disposed between the two spaced primary weld seams.

18. The bumper assembly of claim 10, wherein the at least one reinforcing element is limited to between 30% and 50% of the width of the crumple element.

19. The bumper assembly of claim 10, wherein the at least one reinforcing element is L shaped.

\* \* \* \* \*